United States Patent
Herlocker et al.

(10) Patent No.: US 11,630,820 B2
(45) Date of Patent: Apr. 18, 2023

(54) ANALYSIS OF TIME SERIES SENSOR MEASUREMENTS IN PHYSICAL SYSTEMS

(71) Applicant: Tignis, Inc., Seattle, WA (US)

(72) Inventors: Jonathan L. Herlocker, Seattle, WA (US); Adam Ashenfelter, Albany, OR (US); Steven Herchak, Kelowna (CA)

(73) Assignee: Tignis, Inc., Seattle, WA (US)

( * ) Notice: Subject to any disclaimer, the term of this patent is extended or adjusted under 35 U.S.C. 154(b) by 0 days.

(21) Appl. No.: 17/175,688

(22) Filed: Feb. 14, 2021

(65) Prior Publication Data

US 2022/0261393 A1 Aug. 18, 2022

Related U.S. Application Data

(63) Continuation-in-part of application No. 16/716,993, filed on Dec. 17, 2019.

(51) Int. Cl.
G06F 16/23 (2019.01)
G06F 11/30 (2006.01)
G06F 11/34 (2006.01)

(52) U.S. Cl.
CPC ...... *G06F 16/2365* (2019.01); *G06F 11/3072* (2013.01); *G06F 11/3466* (2013.01)

(58) Field of Classification Search
None
See application file for complete search history.

(56) References Cited

U.S. PATENT DOCUMENTS

| | | | |
|---|---|---|---|
| 2020/0104401 A1* | 4/2020 | Burnett | G06F 16/287 |
| 2021/0287521 A1* | 9/2021 | Stone | G05B 13/0265 |
| 2022/0138492 A1* | 5/2022 | Paulson | G16Y 40/35 |
| | | | 706/12 |

FOREIGN PATENT DOCUMENTS

WO  WO2020139347  7/2020

OTHER PUBLICATIONS

Khan, Shehroz, et al., "Bootstrapping and Multiple Imputation Ensemble Approaches for Missing Data", Journal of Intelligent and Fuzzy Systems, Sep. 2019. (Year: 2019).*
SAS Institute, Inc., "SAS/ETS 15.1 User's Guide: Chapter 15—The EXPAND Procedure", 2018, pp. 1-55. (Year: 2018).*
Tutorial: Time Series Analysis with Pandas, accessed Feb. 13, 2021 from www.dataquest.io/blog/tutorial-time-series-analysis-with-pandas/.
Jensen et al., Time Series Management Systems: A Survey, arXiv:1710.01077 [cs.DB], Oct. 3, 2017.
Kim et al., Making Machine-Learning Applications for Time-Series Sensor Data Graphical and Interactive, ACM Transactions on Interactive Intelligent Systems, vol. 7, No. 2, Article 8. Publication date: Jul. 2017.

(Continued)

*Primary Examiner* — Scott A. Waldron
(74) *Attorney, Agent, or Firm* — Lumen Patent Firm (57) ABSTRACT

A method for analyzing time series sensor data of a physical system represented by a process graph retrieves sensor data streams from stored sensor time series data. Each of the sensor data streams comprises a sequence of time-value pairs and is associated with a sensor identifier, a time offset, and a sampling period. A metric data stream is produced from the retrieved sensor data streams in accordance with a stored physics model of the physical system. Producing the metric data stream includes i) synchronizing the sensor data streams by adjusting time offsets of the sensor data streams and adding interpolated values and times to the sensor data streams to produce synchronized streams with equal sampling periods; and ii) performing a point-wise computation over values of the sensor data streams in accordance with the physics model.

9 Claims, 3 Drawing Sheets

(56) References Cited

OTHER PUBLICATIONS

Rodrigues et al., SSTS: A syntactic tool for pattern search on time series, Information Processing & Management vol. 56, Issue 1, Jan. 2019, pp. 61-76.
Zois, Querying of Time Series for Big Data Analytics, in Handbook of Research on Innovative Database Query Processing Techniques, IGI Global, 2016.
Yang et al., Capturing Connectivity and Causality in Complex Industrial Processes. Springer Cham. 2014.

* cited by examiner

ANALYSIS OF TIME SERIES SENSOR MEASUREMENTS IN PHYSICAL SYSTEMS

FIELD OF THE INVENTION

The present invention relates generally to methods for monitoring and analysis of physical systems.

BACKGROUND OF THE INVENTION

A digital twin for a physical system captures two distinct types of information. The relationships between physical devices (e.g., pumps, fans, filters, cooling coils) may be captured with a graph database. Data from sensors attached to the physical devices may be captured with a time-series database.

To monitor and generate meaningful alerts for a physical system, both forms of information are valuable. The structure of the physical system and the sensor data must be queried and combined as inputs to either rules-based alerts or machine learning based alerts. This is often accomplished with custom software that interacts with the two data stores. Moreover, processing sensor data may be complicated due to missing values, unreliable values, and different reporting rates among sensors. This usually results in alerting software that is complicated and time consuming to modify and deploy, making customization difficult for the maintainers of the physical systems.

BRIEF SUMMARY OF THE INVENTION

In one aspect, the invention provides a method for analyzing time series data of a physical system, the method comprising: a) storing a process graph representing the physical system, wherein nodes of the process graph represent devices of the physical system and edges of the process graph represent causal physical influences between the devices, wherein the devices comprise physical assets and sensors, where the sensors are configured to measure physical quantities; b) storing physics rules representing relations between quantities; c) storing a set of physics models, wherein each of the physics models comprises a physics rule selected from the stored physics rules and an assignment of quantities of the physics rule to properties of the physical system; d) storing sensor time series data, wherein the sensor time series data comprises: i) a sequence of values of a physical quantity measured by one of the sensors paired with ii) a corresponding sequence of times when the values of the sequence of values were measured; e) retrieving sensor data streams from the time series data, wherein each of the sensor data streams comprises a sequence of time-value pairs, wherein each of the sensor data streams is associated with a sensor identifier, a time offset, and a sampling period; f) producing a metric data stream from the retrieved sensor data streams in accordance with a physics model selected from the stored physics models; wherein producing the metric data stream comprises: i) synchronizing the sensor data streams by adjusting time offsets of the sensor data streams and adding interpolated values and times to the sensor data streams to produce synchronized streams with equal sampling periods; and ii) performing a point-wise computation over values of the sensor data streams in accordance with the physics model.

The method may also include defining a machine learning model stream by specifying a type of machine learning model, a training data stream, a time window, and a period; and applying the machine learning model stream to data streams to produce a model output metric data stream.

The method may also include determining a support value for the training data stream, where the support value is indicative of the fraction of missing values in the training data stream; and determining whether the support value exceeds a predetermined threshold.

The machine learning model may be a model selected from the group consisting of linear regression, isolation forests, lightweight on-line detector of anomalies, logistic regression, random forests, and gradient-boosted trees.

The method may also include producing from the sensor data streams interval streams, and/or key-value pairs of metadata.

The properties of the physical system may comprise physical properties derived from a set of sensor nodes of the process graph, or statistical properties derived from a set of sensor nodes of the process graph.

The relations between quantities may be relations between measurable physical quantities, or relations between quantities derived from measurable physical quantities.

DETAILED DESCRIPTION OF THE INVENTION

Figure 1:
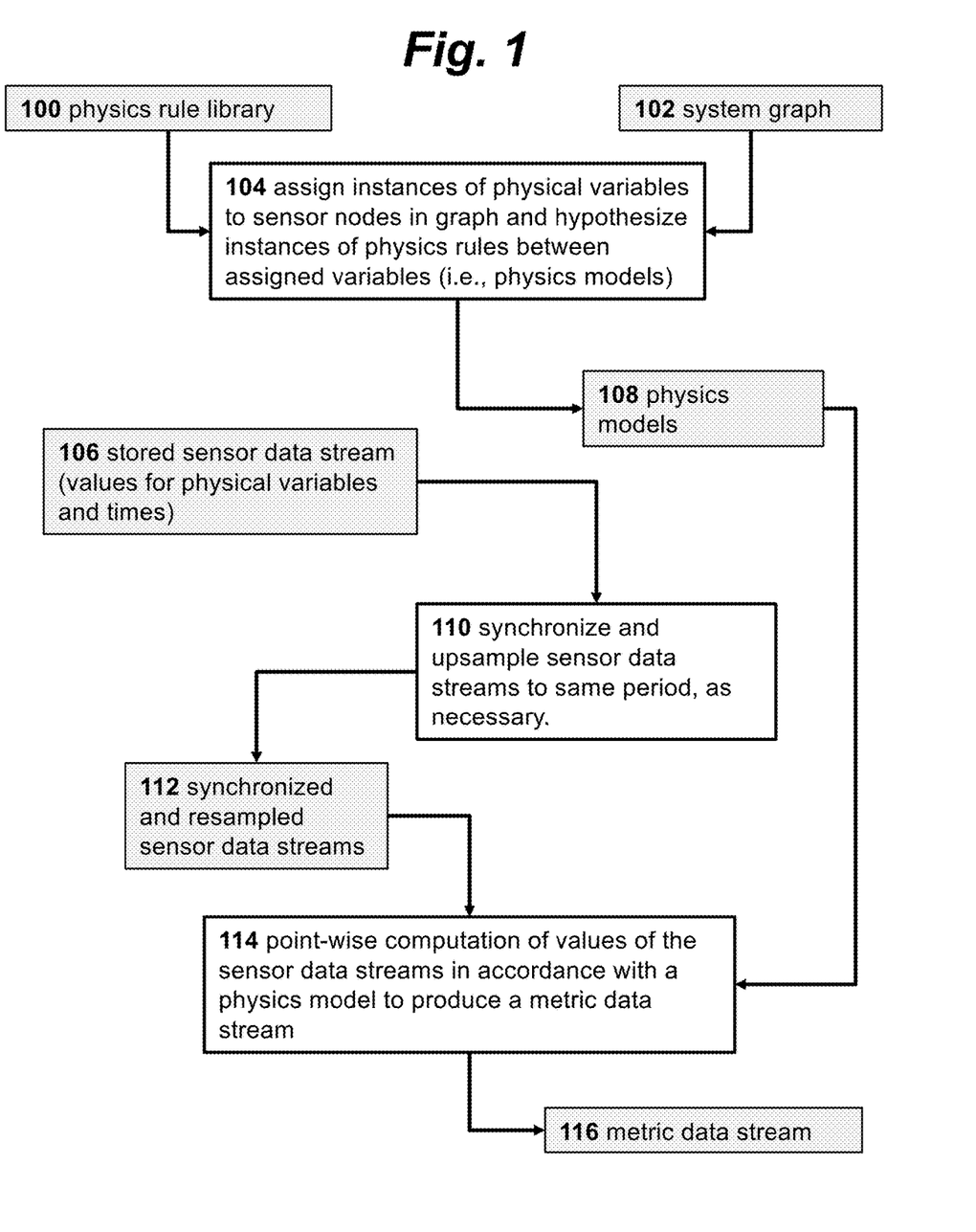
FIG. 1 is a flow chart illustrating the steps of a method for monitoring and analyzing a physical system according to an embodiment of the invention.

FIG. 1 is a flow chart illustrating the steps of a method for analysis of time series data in a physical system according to an embodiment of the invention. A system process graph 102 that represents the physical system is stored in a memory. The graph includes a collection of nodes connected by directed edges, where distinct nodes represent distinct devices of the physical system, and where edges represent causal physical influences between the devices. The devices include assets that perform actions in the physical system and sensors that measure physical quantities in the physical system. A system process graph may also include information such as physical dimensions of process variables and other metadata associated with nodes and edges. A complete process graph contains a node for every transforming process of the system, and an edge for every physical connection or causal relation of the system. In addition, it may also include nodes for sensors that are not associated directly with an asset or transforming process.

A process graph is typically derived from a system process diagram which provides a visual schematic representation of the system, such as an engineering schematic. Such a system process graph is typically created by a subject matter expert based on a system process diagram; the process graph is constructed to contain all physical connections or causal relations as edges and all transforming processes as distinct nodes. Alternatively, the process graph may be created by an automatic transformation of a process diagram using image recognition techniques. For example, starting with an image of a system process diagram, standard image recognition techniques may be used to generate a list of all named entities (equipment and sensors) in the image. Then a trained neural network can recognize in the image standardized schematic icons and generate an itemized list of entities and their types, as well as connections between them. Next, the identified entities are matched with the names, for example, based on proximity of bounding boxes entities and names in the image. This matching could take into account standard conventions for positioning names next to their corresponding schematic icons, e.g., placement of names more frequently above and to the left of the icon than below and to the right.

Starting with a structured diagram instead of an image does not require image or character recognition, since visual elements like lines and boxes and text can be automatically extracted. In such a case, the names and entities can be directly extracted. Then heuristics and machine learning may be used to map the visual elements to semantically meaningful elements (components, sensors, etc.). An example of a heuristic is that we can find a sensor name based on looking for text following the International Organization for Standardization (ISO) standard for piping and instrumentation diagram (P&ID) sensors, then look for lines that begin near to that text and look to see what visual components those lines point to in order to predict to which component the sensor is attached. The above techniques may also be used to examine/analyze a system graph and repair/modify.

Figure 3A:
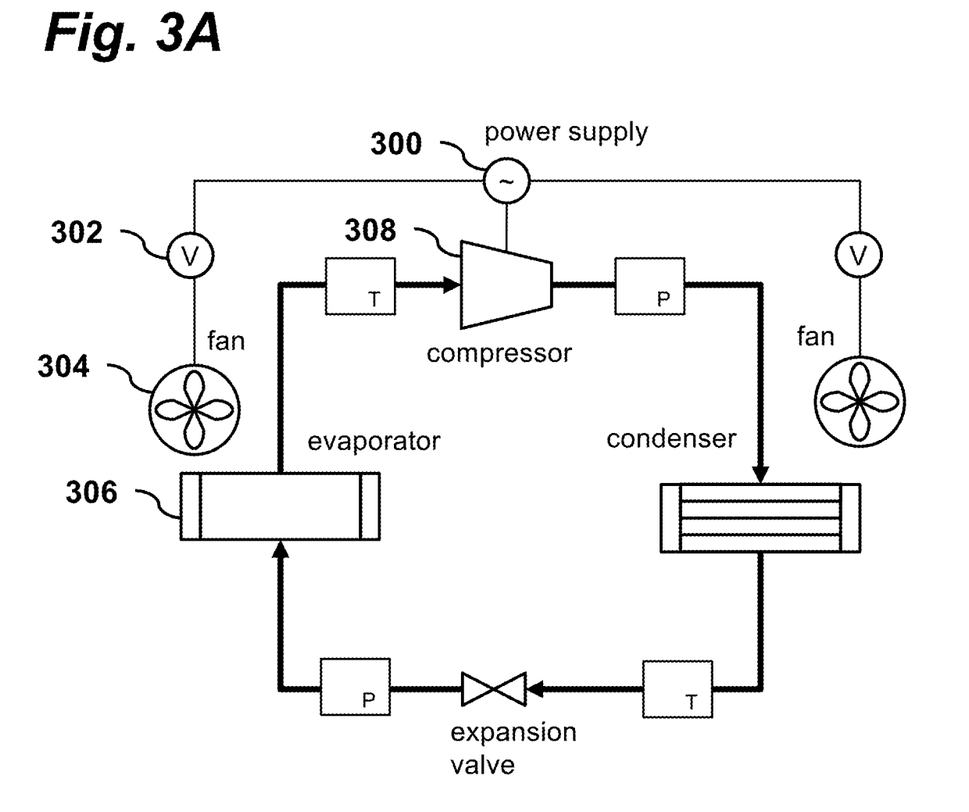
FIG. 3A and FIG. 3B show a schematic process diagram of a physical system and a corresponding process graph, respectively, according to an embodiment of the invention.
Figure 3B:
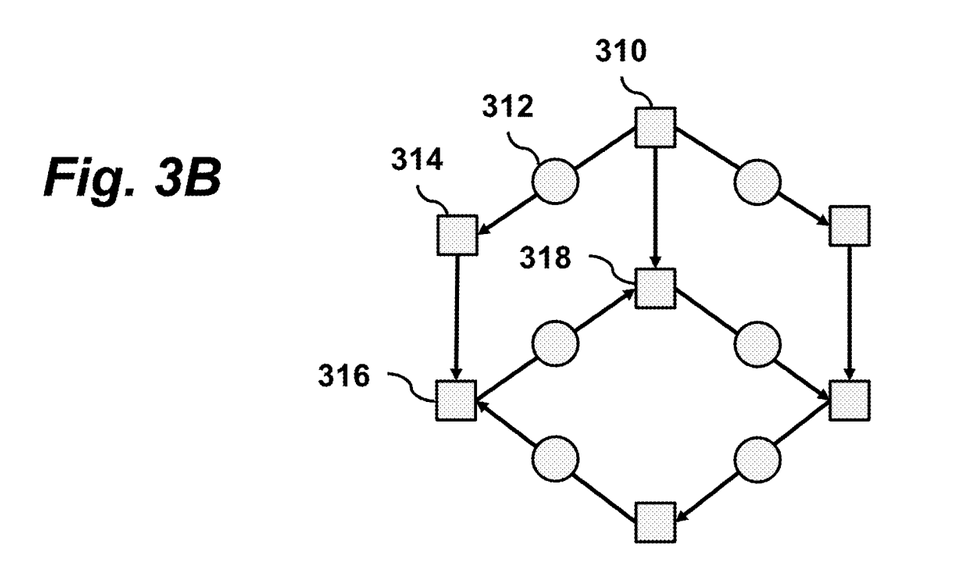

FIG. 3A is an illustrative example of a process diagram of a physical refrigeration system that includes various assets such as power supply 300, fan 304, evaporator 306, and compressor 308. The system also includes various sensors such as voltage meter 302. FIG. 3B is a process graph corresponding to the refrigeration system process diagram of FIG. 3A, where the assets are represented by square nodes and the sensors are represented by round nodes. The directed edges of the graph correspond to electrical or fluidic connections between the assets. For example, nodes 310, 314, 316, 318 represent assets 300, 304, 306, 308, respectively, and node 312 represents sensor 302. The edge from node 310 to node 314 represents the electrical connection from power supply 300 to fan 304, the edge from node 314 to node 316 represents the fluidic connection (i.e., air blowing) from fan 304 to evaporator 306, and the edge from node 316 to node 318 represents the fluidic connection (i.e., flow of refrigerant) from evaporator 306 to compressor 308. The process graph thus provides an abstract representation of the devices in the physical system and their causal physical relationships. The stored process graph also includes physical dimensions (e.g., time, length, mass) and units (e.g., seconds, meters, kilograms) associated with each sensor node.

Returning to FIG. 1, a physics rule library 100 is stored in memory. A physics rule specifies a general mathematical relationship (e.g., function) between quantities. They may be defined in a domain-specific language or in code. Each rule specifies a mathematical relationship between multiple variables. Although some physics rules may represent laws of physics relating physical quantities, physics rules in general may represent relationships between physical or non-physical quantities. The variables is a physics rule represent quantities that are directly or indirectly related to physical quantities measured by the system sensors. Some variables may directly represent physical quantities, in which case the physical dimensions and units of each variable may be specified. For example, the conservation of mass rule (continuity equation) for steady-state flow specifies that the mass flow rate ($kg \cdot s^{-1}$) into and out of any device must be equal, the equation of state of an ideal gas (ideal gas law PV=nRT) specifies a relationship between the pressure ($kg \cdot m^{-1} \cdot s^{-2}$), volume ($m^3$), and temperature (K), where R is the ideal gas constant and n is the number of moles. Some variables may be indirectly related to physical quantities. For example, variables in a rule may represent statistics of one or more physical quantities or scores derived from physical quantities. The physics rule library preferably contains a collection of universal rules that are commonly applicable to portions of industrial systems and plants.

In step 104, the physics rules 100 and system process graph 102 are instantiated as physics models associated with portions of the graph 102. More specifically, each of the physics models associates a physics rule with a set of sensor nodes in the graph that are causally related to each other by assigning each physical variable of the physics rule to one sensor node, such that the physical variable and sensor node have the same physical dimension. For example, a physics model could assign the three variables P, V, T of the physics rule PV=nRT to a pressure sensor, volume sensor, and temperature sensor, respectively, of the process graph. Note that if the volume is assumed constant, the physics rule has only two variables P and T, and the model does not include any assignment to a volume sensor. The physics model may be viewed as a specific instantiation of a physics rule, where the variables of the physics rule are instantiated as localized process variables at particular sensors or other quantities. A physics model thus allows values in data streams from particular sensors, or values in derived data streams, to be related to each other through computation according to the model. The physics rules may, more generally, also include arbitrary computations on data streams, such as computing statistical properties of values in a sensor data stream. Thus, a physics rule may be instantiated as physics models relating quantities derived indirectly from physical quantities. For example, a physics rule could be instantiated to compute a health score of an asset, a predicted time to failure of an asset, or a count of assets of a particular type.

For purposes of illustration, consider a simple sub-graph of a system process graph with nodes A, B, and C connected linearly as follows: A→B→C. This indicates that node A has a causal physical influence on node B, which in turn has a causal physical influence on node C. These nodes A, B, C, might represent, for example, a temperature sensor, a compressor, and a pressure sensor, respectively. So, we can write $T_A$ and $P_C$ for the temperature and pressure process variables at sensors A and C, respectively. These process variables have physical dimensions that match physical dimensions of physical quantities in the physics rule PV=nRT. Thus, assuming equal values of n, R, and V at both A and C, we obtain candidate physics model $P_C V = nRT_A$.

Sensor data 106 from the physical system is retrieved from a data store. The sensor data includes values of physical quantities measured by the sensors of the physical system. The sensor data may include, for each sensor, a time-indexed sequence of numerical values of the physical quantity measured by the sensor. In other words, the sensor data includes time-indexed values of measured process variables for the system, called a sensor data stream. Normally, the time-indices represent times separated by a fixed period, corresponding to the inverse of the sensor sampling rate. Data from different sensors may be stored at different sampling rates, resulting in different periods. Also, when the sensor data is retrieved, or fetched, the resulting sensor data stream may represent a sub-sampled data stream within a time window specified for example by start and end times. The fetched sensor data stream may be live, very recent data, or historical data.

Figure 2:
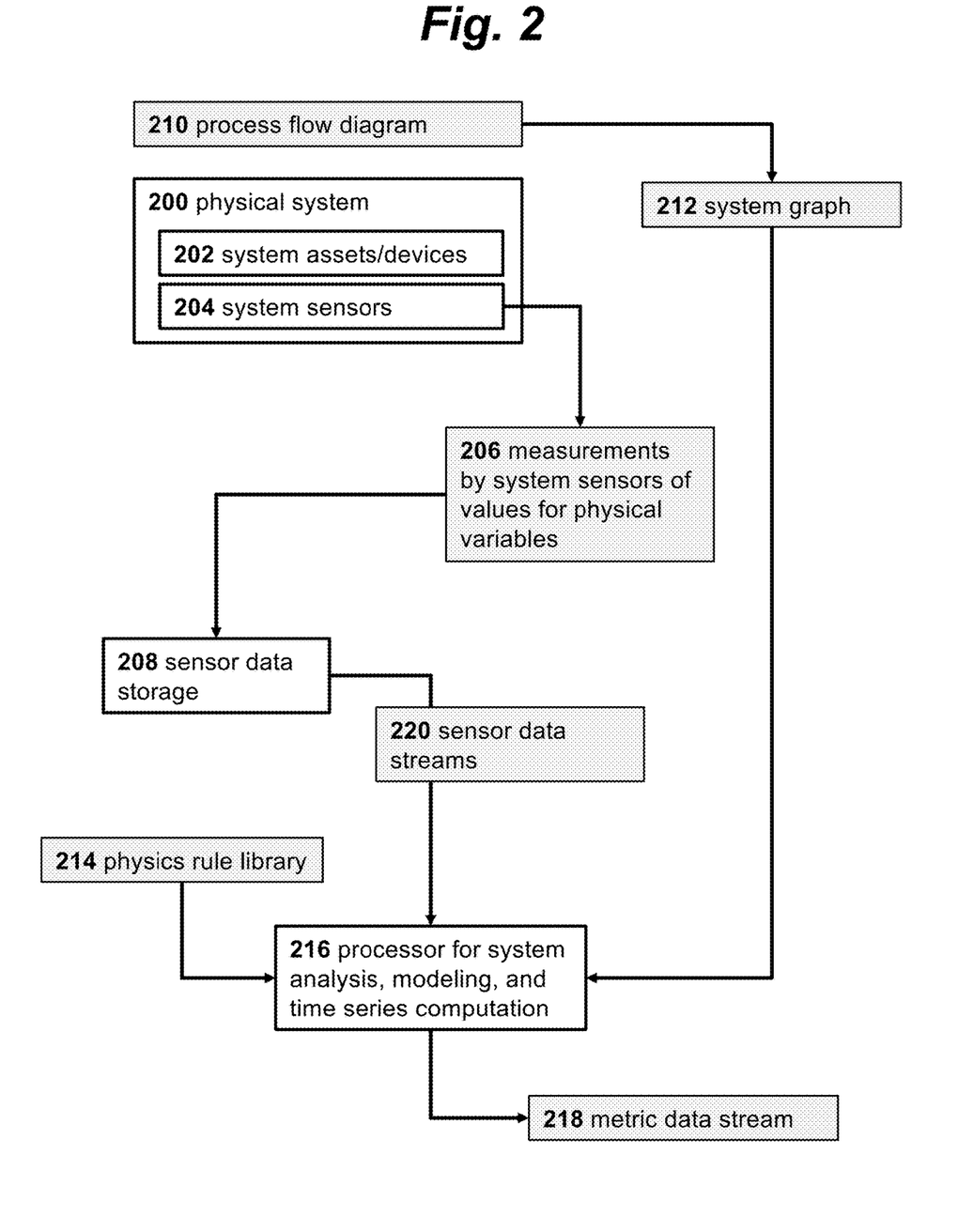
FIG. 2 is schematic diagram illustrating a data processing pipeline for a method for monitoring and analyzing a physical system according to an embodiment of the invention.

As illustrated in FIG. 2, the sensor data 206 originate at the physical system 200 which includes assets 202 and sensors 204. The sensor measurement data 206 is then transmitted to sensor data storage 208 (e.g., cloud storage). In response to queries, portions of sensor data are extracted from the storage and transmitted as sensor data streams 220 to a processor 216 that performs analysis and monitoring computations. The processor 216 uses the sensor data streams 220, physics rule library 214, and system graph 212 derived from system process flow diagram 210 to produce one or more metric data streams 218. Processor 216 may be implemented by a master orchestrator which starts a job for each model for each process graph, where a job may be local thread or an entire cloud hosted machine.

The job fetches its necessary sensor data streams 220 from a local or cloud time series database 208.

Returning again to FIG. 1, in step 110 the sensor data streams 106 that were retrieved from the data store are automatically synchronized and upsampled, if needed, to ensure that they have the same period and starting times. The resulting synchronized and resampled sensor data streams 112 are then used in step 114 to perform a point-wise computation using a physics model 108 to produce a resulting metric data stream 116. These steps will now be described in more detail.

Data Store, Retrieving Data Streams, and Caching

The most common type of stream is a metric data stream, defined as a sequence of time, value pairs, where the values are either numeric or categorical. A stream may contain missing values, i.e., some values may be null. The period of a stream may be provided as an input when defining the stream or may be determined automatically by inspecting the first pairs of a stream, or it may be missing if no regular period is found.

A stream may be either synchronized or unsynchronized. A stream is synchronized if it has a period and its values occur at times that, when shifted by a time offset, are integral multiples of the period, i.e., (timestamp+anchor) mod per=0, where the 'anchor' is the stream time offset.

A stream has a finite sequence of time, value pairs within a time window defined by a starting time and ending time. A sensor data stream is retrieved or fetched from a time series sensor data store. The data store could be represented as CSV files, a time series database, or accessed through a cloud service. The time series data for a particular sensor can be identified in a time series database query by specifying a unique sensor entity ID and name of a physical quantity measured by the sensor (note that a sensor may measure multiple physical quantities).

Preferably, each stream fetched from the time series database is referred to by some unique stream ID, allowing a caching layer to be implemented on top of the fetch. Unlike standard caches, caching is preferably implemented by storing segments of a stream. When creating a stream cache, the underlying function for producing the stream is defined. A stream cache query expects a unique ID (or key) and a start and end range. If the cache has all or part of the range available, it will return that portion of the stream. For the portion of the interval that was missing the stream is fetched (or calculated/trained in the case of non-metric streams) according to the producer function. The cache may be built using interval trees, segment trees, or other data structures as long as the interface allows queries over a range.

The stream cache may be advantageously combined with other hashes of stream computations. Whenever an operation takes place on a metric stream, the existing hash (or id) of the stream is combined with parameters defining the operation to produce a new unique hash (or id). These hashes are created when transforming any stream type (metrics, rows, models), and encapsulate everything that makes that stream unique. This allows the stream caching mechanism to be applied to all stream types and allows caching of intermediate states of computations. If final or intermediate stream computations are found in the stream cache then the evaluation may use them, skipping expensive recently performed computations such as re-building models or fetching their supporting metric streams.

Note that the cache may exist in local memory or it may be a cloud service. This may be customized according to the stream type. So, a metric stream may be cached in local memory while the more expensive model streams may be cached by a cloud service.

Synchronizing and Resampling Streams

Operations between two or more streams assumes that the streams have been synchronized. To facilitate this, the synchronization state of each stream is tracked in a computation. In addition, automatic synchronization of streams is performed when necessary to perform a computation involving the streams. The automatic synchronization finds the greatest common denominator (GCD) in seconds of the periods of the streams, and uses that as the period of the resultant stream. While synchronization periods can be manually specified, automatic synchronization with GCD is the best practice. It is the largest period that ensures that there will be no data loss when performing operations over both streams, such as adding two metrics. Two unsynchronized metrics may have brief periods when the sum of their most recent values is above some threshold. Using a synchronization period larger than the GCD can lead to those moments disappearing in the resulting data stream.

Synchronization frequently typically results in the need to fill in values in the resulting stream. A time series fill may be used to interpolate between pre-existing values of the stream in one of two methods. Filled in points may either use linear interpolation or a fill-forward approach where the last known value is repeated. The default is fill-forward as linear interpolation may not be computable when the next data point is not yet available (e.g., real-time scenarios).

Types of Computations on Data Streams

The simplest type of stream computations is uniformly performing point-wise arithmetic operations on values of a metric stream to produce a new metric stream. For example, a temperature sensor data stream with values measured in degrees F. may be converted to a temperature sensor data stream with values measured in degrees C. by computing a point-wise function $T_C=(5/9)*(T_F-32)$, where $T_F$ and $T_C$ represent temperature values at the same time point in the two streams.

Stream computations may also combine multiple streams to produce a new stream by performing point-wise functions of values of the streams. If the streams are not already synchronized, they will be automatically synchronized using the process described earlier so that the point-wise computation is well-defined.

For example, the following represents a computation of fluid power with two metric streams representing flow and pressure as input: fluidPower=flow*pressure.

Stream operations also include logic operators (and, or, not) and comparison operators ($>$, $>=$, $<$, $<=$, $==$, $!=$). For logic operations, values are treated as false when they are null (have missing values), and the 'or' will return the point-wise value from the first metric stream that is true, while 'and' will return the value from the last metric when both are true. These operations may also be performed with a stream and a constant. For example, hiFlowLowPressure= (FLOW>10) and (PRESSURE<10) returns a stream whose point-wise values are pressure values less than 10 whenever the flow value is more than 10. At points where either condition fails, the resulting stream value is null.

Stream operations can also include point-wise functions such as mean and max:
 mean(FLOW1, FLOW2, FLOW3)
 max(FLOW1, FLOW2)

The period of the resulting stream of a stream operation can be specified.
 max(FLOW1, FLOW2) per 1 h The duration of the window of the resulting stream can also be specified:
 mean(FLOW) over 1 h Window operations produce a single value from all the values of one or more streams within a specified window. Examples of window operations are as follows:
 count: The number of non-missing values in the stream.
 support: The count of non-missing values divided by the total count.
 sum: The sum of the non-missing values.
 mean: The mean of the non-missing values.
 min: The minimum of the non-missing values.
 max: The maximum of the non-missing values.
 spread: The difference between the max and the min.
 mode: The most common non-missing value.
 median: Median of the non-missing values.
 quantile: The desired quantile (extra parameter) over the non-missing values.
 variance: Variance of the non-missing values.
 stdev: Standard deviation of the non-missing values.

Stream operations over windows may not produce desired results if one or both streams contain missing values, due to sensor data reporting gaps. Thus, parameters may be specified for the operation to filter results according to a condition that a minimum number (count) of values is present in the input stream:
 mean(PRESSURE) over 1 h when(count>5)

This provides a way to throw out aggregations that might not be trustworthy due to missing values. The count depends on the period of the underlying input stream. Alternatively, the operation may be filtered depending on the ratio of the count of non-missing values to the total number of values in the window, called the support. This allows expressive filters that are not dependent on the period. For example, this operation would only produce a mean pressure value when the pressure sensor stream has non-missing values for at least half of the values during an hour:
 mean(PRESSURE) over 1 h when(support>0.5)

Streams can also be filtered using other types of conditions:
 high_pressure_flow=FLOW when(PRESSURE>10);

Stream Types

Streams are sequences of (time, value) pairs. The type of value determines the type of the stream:
 Metric: The value is numeric or categorical.
 Row: The value is a list of numeric or categorical values. List length cannot change.
 Model: The value is a model that meets the model interface described later below.

A row stream can be constructed by specifying multiple metric streams as an input. At each point in the resulting stream, the value is a list of values from the corresponding points of the input metric streams. Each input metric stream is automatically synchronized as needed. A period may be specified for the resulting row stream:
 FlowPressureData=row(FLOW, PRESSURE) per 30 m Row streams of the same type can be interleaved to merge the data. For example, flow and pressure row streams from three sensors can be merged to form a single row stream whose points have a list value including six quantities.
 FlowPressData=interleave (FlowPressData1, FlowPressData2, FlowPressData3)

The period of the new interleaved stream will be autodetected if not specified.

Machine Learning Models

Row streams may be used to build machine learning models over data derived from multiple entities. For example, an isolation forest model can be generated, training it periodically over a specified duration of the data for the three pumps discussed above.
 detectors=model(FlowPressData, type='iforest') over prev 60 d per 7 d;

The model operation takes as input a stream of rows, an optional stream of metrics, and optional parameters. The result is a stream of models. Each point in a model stream is a machine learning model. A model, in this case, is built given a set or rows and can also accept a row and produce a score, such as the case when 'apply' is used, as described below.

While each point in a model stream is a model, each such model is not necessarily stored. The information required to build any of the models in the stream is stored and used on demand as needed.

If building an unsupervised model, only a stream of rows is required along with a model type and optional model parameters. The operation can optionally take a metric stream to use as the objective (or target) for supervised machine learning models. For example, a stream of linear regression models can be built, each trained to predict the future flow rate one hour in the future:
 data=row(FLOW, PRESSURE, flowChange, pressureChange) per 30 m;
 target=shift(FLOW) forward 1 h;
 predictors=model(data, target, type='lr') over prev 60 d per 7 d;

Various other machine learning models may be used, including isolation forests, lightweight on-line detector of anomalies, logistic regression, random forests, and gradient-boosted trees.

Machine learning models should adhere to the following abstractions.
 build(seed, training_rows, params?, target_metric?)

A model is buildable given a seed value, a sequence of rows, an optional set of parameters, and for supervised models a sequence of target metrics. A seed is provided for models that use a stochastic process during construction. A 'build' always produces the exact same model given the same inputs.
 apply(model, row, params?)

The models produced with 'build' support an 'apply' where the model produces either a numeric or categorical value given a single row and optional parameters. An unsupervised anomaly detection model may produce numeric anomaly scores when applied. A supervised decision tree model may produce a categorical prediction when applied.

Some models can produce a variety of information when applied to a row. For instance, a decision tree might produce a categorical prediction for the most likely class, or it might produce a numeric estimate of the probability for a particular class. The optional parameters allow the output of the apply to be customized.

The apply operation takes as input a stream of models and a stream of rows. It applies the most recent model in the model stream to each row in the row stream to produce a result metric stream. This result stream may be, for example, anomaly scores for anomaly detection models or predictions for predictive models. The result stream will have a period matching the row stream.

As an example, the following illustrates the creation of a stream of anomaly detection models and applying it to a stream of rows to generate anomaly scores as a metric stream.

data=row (OAT, RAT, MAT, hourOfDay( )) per 10 m;
    detectors=model(data, type='iforest') over prev 21 d per 1 d;
    score=apply(detectors, data);

The 'ensemble' operation takes a stream of models as input and produces a new stream of models as a result. All the models that occur within the ensemble's 'over' period will be used to create a new meta-model. These meta-models are the models that appear in the resulting model stream. When applying the meta-model to a row the results of the underlying models will be combined. For regression models the default aggregation is 'mean' while for classification models the default is 'mode'.

The 'ensemble' method helps model streams to evolve more smoothly. Models no longer replace one another whole cloth as time progresses, instead the ensemble's meta-model changes incrementally as individual models move into and out of the window.

detectors=model(data, type='iforest') over prev 60 d per 7 d;
    detectorEns=ensemble(detectors) over prev 30 d;

Model construction is approached like another time window operation. This greatly simplifies the process of orchestrating models over time (sometimes referred to as machine learning lifecycle or ML Ops).

The use of 'count' and 'support' easily allows filtering out models that lack enough training data due to missing values. In this example models are dropped if more than half the rows contain missing values:

model(data, type='iforest') over 60 d per 7 d when (support>=0.5)

Because streams are cached, model construction and storage reduce to a caching problem. Whenever building a model it may be cached either locally, in memory, or in a distributed cloud storage medium. Models that have not been used in some time frame (no cache hits) may be safely removed. If a computation ever needs the model again, the entire computation flow is defined for recreating that model. This simplifies the need to store models in perpetuity found in many ML Ops frameworks.

When building a machine learning model, there are often interesting and important attributes collected during training. As one example, a regression model might collect the mean squared error over the training data.

The model attributes are represented as metric streams. This is a powerful way to explore how a model stream changes over time. For example, one model attribute is the training mean squared error of a logistic regression model. The stream of this attribute represents how the model evolves over time and can be used to highlight periods when the error becomes concerning.

predictors=model(data, target, type='lr') over prev 60 d per 7 d;
    trainMSE=predictors:train_mse;
    return trainMSE, intervals(trainMSE>50);

The invention claimed is:

1. A method for analyzing time series data of a physical system, the method comprising:
   a) storing a process graph representing the physical system, wherein all nodes of the process graph represent devices of the physical system and all edges of the process graph represent causal physical influences between the devices, wherein the devices comprise physical assets and sensors, where the sensors are configured to measure physical quantities;
   b) storing physics rules representing relations between quantities;
   c) storing a set of multiple physics models, wherein each of the multiple physics models comprises a physics rule selected from the stored physics rules and an assignment of quantities of the physics rule to properties of the physical system;
   d) storing sensor time series data, wherein the sensor time series data comprises: i) a sequence of values of a physical quantity measured by one of the sensors paired with ii) a corresponding sequence of times when the values of the sequence of values were measured;
   e) retrieving sensor data streams from the time series data, wherein each of the sensor data streams comprises a sequence of time-value pairs, wherein each of the sensor data streams is associated with a sensor identifier, a non-zero time offset, and a sampling period;
   f) producing a metric data stream from the retrieved sensor data streams in accordance with a physics model selected from the stored set of multiple physics models;
   wherein producing the metric data stream comprises:
   i) synchronizing the sensor data streams by adjusting non-zero time offsets of the sensor data streams and adding interpolated values and times to the sensor data streams to produce synchronized sensor data streams with equal sampling periods: wherein the synchronized data streams have a common period given by a greatest common denominator of periods of the sensor data streams; and
   ii) performing a point-wise computation over values of the synchronized sensor data streams in accordance with the physics model.

2. The method of claim 1 further comprising:
   defining a machine learning model stream by specifying a type of machine learning model, a training data stream, a time window, and a period;
   applying the machine learning model stream to data streams to produce a model output metric data stream.

3. The method of claim 2 further comprising:
   determining a support value for the training data stream, where the support value is indicative of the fraction of missing values in the training data stream; and
   determining whether the support value exceeds a predetermined threshold.

4. The method of claim 2 wherein the machine learning model is a model selected from the group consisting of linear regression, isolation forests, lightweight on-line detector of anomalies, logistic regression, random forests, and gradient-boosted trees.

5. The method of claim 1 further comprising producing from the synchronized sensor data streams interval streams, and/or key-value pairs of metadata.

6. The method of claim 1 wherein properties of the physical system comprise physical properties derived from a set of sensor nodes of the process graph.

7. The method of claim 1 wherein properties of the physical system comprise statistical properties derived from a set of sensor nodes of the process graph.

8. The method of claim 1 wherein the relations between quantities are relations between measurable physical quantities.

9. The method of claim 1 wherein the relations between quantities are relations between quantities derived from measurable physical quantities.

* * * * *